United States Patent
Florea

(10) Patent No.: US 12,202,439 B2
(45) Date of Patent: Jan. 21, 2025

(54) IN-VEHICLE CARRIER SYSTEM WITH MOBILITY PROTECTION MECHANISM AND METHOD OF MANUFACTURE THEREOF

(71) Applicant: Rubicon Dog Company, San Jose, CA (US)

(72) Inventor: Alex Florea, San Jose, CA (US)

(73) Assignee: RUBICON DOG COMPANY, San Jose, CA (US)

( * ) Notice: Subject to any disclaimer, the term of this patent is extended or adjusted under 35 U.S.C. 154(b) by 499 days.

(21) Appl. No.: 17/500,722

(22) Filed: Oct. 13, 2021

(65) Prior Publication Data

US 2023/0116298 A1    Apr. 13, 2023

(51) Int. Cl.
| | | |
|---|---|---|
| *B60R 7/04* | (2006.01) | |
| *A01K 1/01* | (2006.01) | |
| *A01K 1/02* | (2006.01) | |
| *B23P 19/00* | (2006.01) | |
| *B65D 88/00* | (2006.01) | |

(52) U.S. Cl.
CPC .............. *B60R 7/04* (2013.01); *A01K 1/0103* (2013.01); *A01K 1/0272* (2013.01); *B23P 19/00* (2013.01); *B65D 88/00* (2013.01)

(58) Field of Classification Search
CPC ......... B60R 7/04; B60R 7/043; A01K 1/0103; A01K 1/0272; B23P 19/00; Y10T 29/49826; B65D 88/00
See application file for complete search history.

(56) References Cited

U.S. PATENT DOCUMENTS

| | | | |
|---|---|---|---|
| 3,771,686 A | 11/1973 | Brison | |
| 6,223,691 B1 | 5/2001 | Beattie | |
| 7,617,917 B2 | 11/2009 | Hai et al. | |
| 8,015,948 B2 | 9/2011 | Hall | |
| 8,056,966 B2 * | 11/2011 | Edwards | B60R 5/04 296/37.6 |
| 8,915,216 B2 | 12/2014 | Hoegh et al. | |
| 9,540,026 B2 * | 1/2017 | Giampavolo | B62B 5/082 |
| 9,688,299 B2 * | 6/2017 | Giampavolo | B62B 3/1444 |
| 9,738,134 B1 * | 8/2017 | Rittenour | B60H 1/00357 |
| 9,789,909 B2 * | 10/2017 | Erspamer | B60J 5/0487 |
| 10,166,836 B2 * | 1/2019 | Rittenour | F02B 67/06 |
| 10,208,975 B2 | 2/2019 | Azevedo et al. | |
| 10,967,803 B1 | 4/2021 | Siciliano | |
| 11,066,105 B2 * | 7/2021 | Lutz | B62D 21/183 |
| 11,161,537 B2 * | 11/2021 | Giampavolo | B62B 3/1444 |

(Continued)

FOREIGN PATENT DOCUMENTS

| | | |
|---|---|---|
| CN | 205284536 U | 6/2016 |
| CN | 214282669 U | 9/2021 |
| KR | 101915759 B1 | 10/2017 |

*Primary Examiner* — Lawrence Averick
(74) *Attorney, Agent, or Firm* — Skaar Ulbrich Macari, PA

(57) ABSTRACT

An in-vehicle carrier system comprising: a base floor assembly including: a floor surface including a liquid drain, a supporting channel below the floor surface and open to the liquid drain, a pedestal below the floor surface and coupled to the supporting channel; a first sidewall attached to the base floor assembly on the floor surface; a second sidewall attached to the base floor assembly on the floor surface; and a crossbar attached above the pedestal and connected to the first sidewall and the second sidewall.

10 Claims, 8 Drawing Sheets

(56) References Cited

U.S. PATENT DOCUMENTS

| | | | |
|---|---|---|---|
| 12,017,702 B2* | 6/2024 | Erspamer | B60J 10/86 |
| 2008/0184941 A1 | 8/2008 | Hai et al. | |
| 2010/0043725 A1 | 2/2010 | Hall | |
| 2010/0066129 A1* | 3/2010 | Edwards | B60R 13/07 |
| | | | 296/208 |
| 2013/0068172 A1 | 3/2013 | Hoegh et al. | |
| 2013/0292979 A1* | 11/2013 | Giampavolo | B62B 5/082 |
| | | | 297/256.17 |
| 2014/0265285 A1* | 9/2014 | Erspamer | B60N 2/986 |
| | | | 280/783 |
| 2014/0319889 A1* | 10/2014 | Giampavolo | B62B 5/082 |
| | | | 297/256.17 |
| 2016/0057968 A1 | 3/2016 | Chandler | |
| 2017/0027131 A1 | 2/2017 | Brownridge | |
| 2017/0097169 A1 | 4/2017 | Azevedo et al. | |
| 2017/0291625 A1* | 10/2017 | Giampavolo | B62B 3/144 |
| 2017/0368902 A1* | 12/2017 | Rittenour | F02B 67/06 |
| 2019/0085604 A1* | 3/2019 | Pearson | A01K 1/0272 |
| 2022/0063694 A1* | 3/2022 | Giampavolo | B62B 3/144 |

* cited by examiner

IN-VEHICLE CARRIER SYSTEM WITH MOBILITY PROTECTION MECHANISM AND METHOD OF MANUFACTURE THEREOF

TECHNICAL FIELD

An embodiment of the present invention relates generally to an in-vehicle carrier system, and more particularly to a utility transport system for cargo and pets.

BACKGROUND

While transporting cargo or pets in a vehicle, the risk of damage to the cargo or pet during an accident has prompted states to require a restraining system to keep objects from being catapulted through the vehicle upon impact. As requirements for child safety seats have evolved over the years, people's pets are now the focus of new requirements to prevent injury or death.

Thus, a need still remains for in-vehicle carrier system with mobility protection mechanism to provide improved safety and comfort to people and pets travelling in the vehicle. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides an in-vehicle carrier system comprising: a base floor assembly including: a floor surface including a liquid drain, a supporting channel below the floor surface and open to the liquid drain, a pedestal below the floor surface and coupled to the supporting channel; a first sidewall attached to the base floor assembly on the floor surface; a second sidewall attached to the base floor assembly on the floor surface; and a crossbar attached above the pedestal and connected to the first sidewall and the second sidewall.

An embodiment of the present invention provides a method of manufacture of an in-vehicle carrier system including: molding a base floor assembly including: forming a floor surface including a liquid drain, positioning a supporting channel below the floor surface and open to the liquid drain, attaching a pedestal below the floor surface and coupled to the supporting channel; attaching a first sidewall, formed by a molding process, to the base floor assembly on the floor surface; attaching a second sidewall, formed by molding, to the base floor assembly on the floor surface; and attaching a crossbar, formed by molding, above the pedestal and connected to the first sidewall and the second sidewall.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
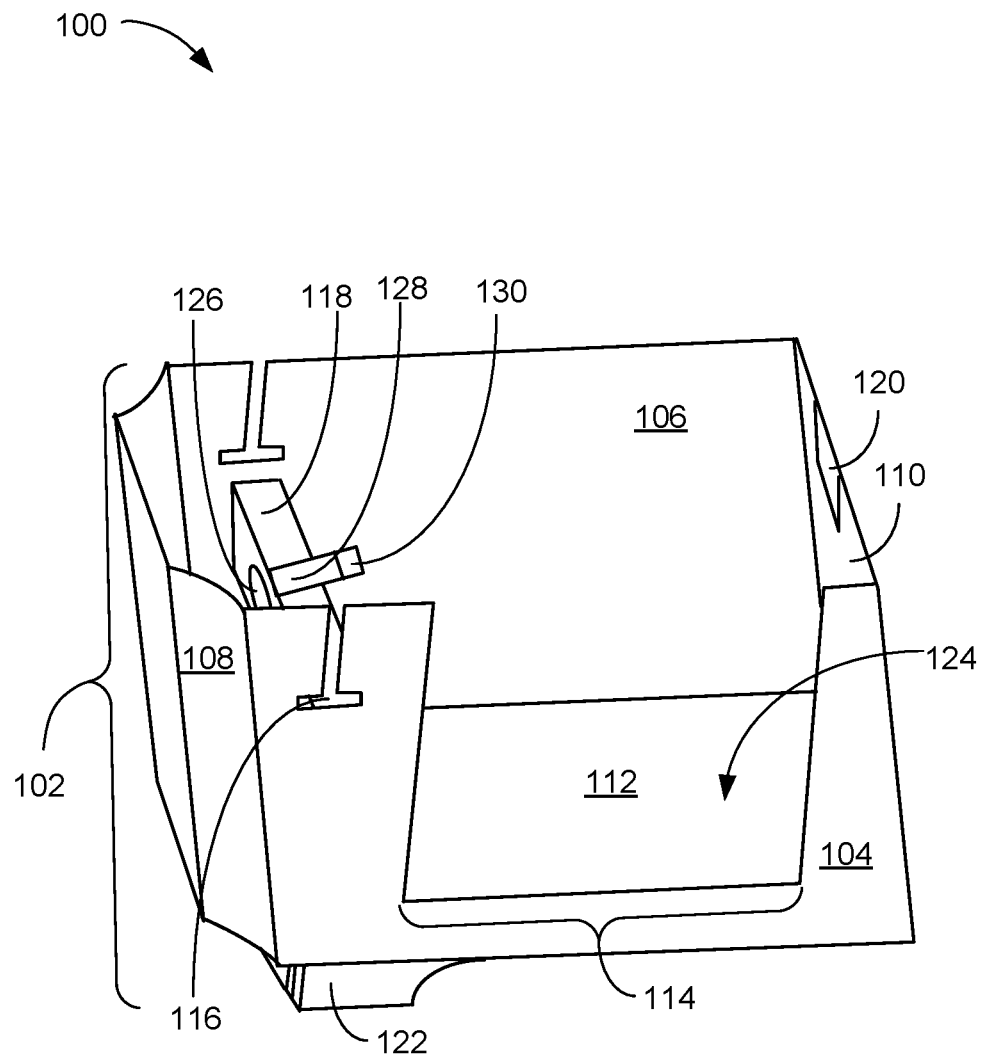
FIG. 1 is an example of a perspective drawing of an in-vehicle carrier system with mobility protection mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

As an example, some of the features of the in-vehicle carrier system are shown having an exaggerated size in order to reveal pertinent details. The special relationships of features in the in-vehicle carrier system are approximate and are not intended to limit the design of the embodiments.

The term "horizontal" as used herein is defined as a plane parallel a level plane on the surface of the Earth. The term "vertical" refers to a direction perpendicular to the horizontal as just defined. Terms, such as "on", "above", "below", "bottom", "top", "side" (as in "sidewall"), "higher", "lower", "upper", "over", and "under", are defined with respect to the horizontal plane. The term "on" referred to herein is defined as two components in direct contact with each other with no intervening elements. The term "couple" referred to herein is defined as multiple objects linked together by providing contact through an intermediate element or communicating through wired or wireless means. The term "attach" referred to herein is defined as joining parts by engaging interlocking features.

Referring now to FIG. 1, therein is shown an example of a perspective drawing of an in-vehicle carrier system 100 with mobility protection mechanism in an embodiment of the present invention. The perspective drawing of the in-vehicle carrier system 100 depicts a carrier assembly 102 can include a first sidewall 104, a second sidewall 106 opposite the first sidewall 104, a backwall assembly 108, a front wall assembly 110, a base floor assembly 112, a crossbar 118, or a combination thereof. The carrier assembly 102 can be an initial stage of the in-vehicle carrier system 100 before feature elements are added. The carrier assembly 102 can support only a few of the features of the in-vehicle carrier system 100.

The first sidewall 104, the second sidewall 106, the backwall assembly 108, the front wall assembly 110, the crossbar 118, the base floor assembly 112, or a combination thereof can be formed by a number of methods. For example, one of these methods can include a rotomolding process in a fixed wall thickness hollow panel format. The rotomolding process or rotational molding plastic process can utilize a sealed mold containing an amount of plastic resin required to coat the walls of the mold to a specific thickness. The mold is then rotated through a melting process, a cooling process, and a release process under automation control. The rotation of the mold during the melting process utilizes centrifugal force to evenly coat the walls of the mold. The plastic resin can be chosen from low-density polyethylene (LDPE), linear low-density polyethylene (LLDPE), cross-linked polyethylene (PEX), high-density polyethylene (HDPE), polycarbonate, nylon, polyvinyl chloride (PVC), polypropylene, or a combination thereof.

The first sidewall 104 can include a door opening 114 and a tie-down slot 116. A second sidewall 106, opposite the first sidewall 104, includes the tie-down slot 116. The crossbar 118 can be fastened between the first sidewall 104 and the second sidewall 106 and positioned directly below the tie-down slot 116. The crossbar 118 can provide structural stability between the first sidewall 104 and the second sidewall 106 when the tie-down slot 116 is utilized.

The backwall assembly 108 can be joined to the first sidewall 104 and the second sidewall 106 proximate the tie-down slot 116. The joining of the backwall assembly 108 can be performed by ultrasonic bonding, tongue and groove insertion, interlocking features, a common molding process, or a combination thereof. The backwall assembly 108 can be configured to match the contour of an OEM vehicle seat (not shown).

The front wall assembly 110 can align with and interlock to the first sidewall 104 and the second sidewall 106, opposite the backwall assembly 108. The front wall assembly 110 can be formed to include a controller housing 120 at a central location of the front wall assembly 110 and opposite the base floor assembly 112. The controller housing 120 can provide a location for added features and electronic monitoring.

Each of the first sidewall 104, the second sidewall 106, the backwall assembly 108, and the front wall assembly 110 can align with and interlock to the base floor assembly 112. The base floor assembly 112 can include a pedestal 122 positioned adjacent to the backwall assembly 108. The pedestal 122 is positioned below a floor surface 124 to maintain a level orientation for the base floor assembly 112. The floor surface 124 can be textured to provide a non-slip surface to the base floor assembly 112. Other features of the base floor assembly 112 will be discussed in subsequent figures.

The crossbar 118 can include a slotted opening 126 facing the backwall assembly 108 and the front wall assembly 110. The slotted opening 126 can provide an attachment point for other features of the in-vehicle carrier system 100 discussed in subsequent figures. A tether 128 can be mounted on the crossbar 118. The tether 128 can be integrated as part of the crossbar 118 or mounted in an adapter recess (not shown). The tether 128 can include a release mechanism 130 at the end of the tether 128 facing the front wall assembly 110. The release mechanism 130 can respond to mechanical action or electronic signals to actuate the release mechanism 130.

By way of an example, the in-vehicle carrier system 100 can be used as a pet carrier by providing a level stable platform for a pet to stand, sit, or lay on the floor surface 124. A leash or harness can be coupled to the tether 128 by the release mechanism 130 in order to provide stability to the pet. By way of a further example, the in-vehicle carrier system 100 can be used as a cargo container. The in-vehicle carrier system 100 can contain a cooler, a box of tools, groceries, discrete packages, bottles, or prepared food for delivery. Applications of the in-vehicle carrier system 100 can be a protection mechanism for live pets or inanimate objects that could be damaged due to motion during transportation.

It has been discovered that the in-vehicle carrier system 100 can be configured for different purposes starting with the base floor assembly 112. By attaching or interlocking the first sidewall 104, the second sidewall 106, the backwall assembly 108, and the front wall assembly 110, either separately or in combination, the in-vehicle carrier system 100 can support different roles for safely transporting the cargo or pets for which it is configured.

Figure 2:
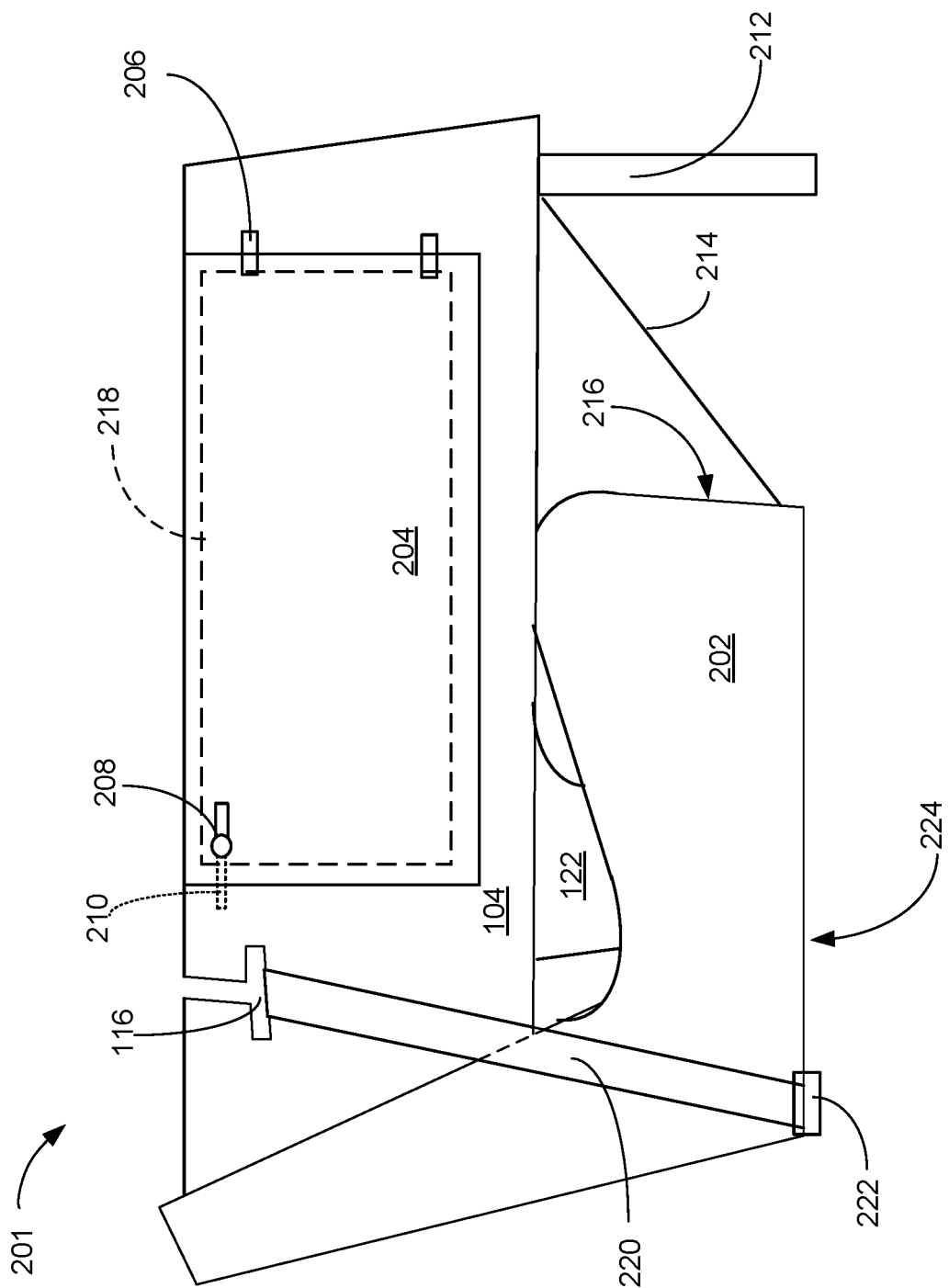
FIG. 2 is a side view of an example of an application of the in-vehicle carrier system in an embodiment.

Referring now to FIG. 2, therein is shown a side view of an example of an application 201 of the in-vehicle carrier system 100 in an embodiment. The side view of an example of an application 201 depicts a vehicle back seat 202 having the in-vehicle carrier system 100 mounted upon it. The pedestal 122 can provide a level reference for the base floor assembly 112 of FIG. 1 on the vehicle back seat 202. The first sidewall 104 can have an access door 204 mounted in the door opening 114 of FIG. 1. The access door 204 can be formed by the rotational molding plastic process in a similar process that was used for the first sidewall 104, a pair of a non-rattle hinge 206 can be arranged to mount the access door 204 into the door opening 114. The non-rattle hinge 206 can be formed of plastic strips with a relief pattern that allows the non-rattle hinge 206 to silently bend without vibration or rattling. A slide latch 208 can be formed in the access door 204 opposite the non-rattle hinge 206. A locking pin 210 can be activated by sliding the slide latch 208 toward the tie-down slot 116, in order to engage the locking pin 210 in the first sidewall 104 and hold the access door 204 in place. In an embodiment, the locking pin 210 can be tapered to allow a tight fit and prevent vibration or rattling of the access door 204.

A telescoping support 212 can be attached to the base floor assembly 112 in order to prevent the in-vehicle carrier system 100 from tipping or sagging. An anchor strap 214 can extend from the base floor assembly 112 to a front portion 216 of the vehicle back seat 202 in order to prevent bouncing of the in-vehicle carrier system 100 when crossing rough terrain or traversing speed bumps.

It is understood that the in-vehicle carrier system 100 can be anchored to the vehicle back seat 202 by engaging a restraining strap 220 through the tie-down slot 116 and tensioned to a structural anchor 222 positioned at a base 224 of the vehicle back seat 202. The restraining strap 220 can include a ratchet strap, a seat belt, a lap belt extender, or the like providing sufficient tension to prevent the in-vehicle carrier system 100 from moving away from the vehicle back seat 202. The structural anchor 222 can be secured to the frame that holds the vehicle back seat 202. The structural anchor 222 can include a seat belt anchor, a lower anchors and tethers for children (LATCH) system, an ISOFIX vehicle anchor system, an aviation restraint anchor, a cargo anchor, a child safety seat latch clip, or a combination thereof.

In an embodiment, the first sidewall 104 and the access door 204 can be filled with a bullet proof core 218. The bullet proof core 218 can include Kevlar ceramic plates, Kevlar impregnated rubber plates, or the like. This configuration can be suitable for Military or Law Enforcement applications when the in-vehicle carrier system 100 is used to transport a trained dog, as in a K9 unit. During manufacturing, the bullet proof core 218 can be suspended in the mold for the rotomolding process or the plastic resin can be extruded into the gap between the mold and the bullet proof core 218.

It has been discovered that the in-vehicle carrier system 100 can provide a stable and silent enclosure for carrying cargo or live animals. The facility to apply the restraining strap 220 can assure the in-vehicle carrier system 100 is held in a level position in the vehicle back seat 202. By the use of the non-rattle hinge 206 and the slide latch 208, the access door 204 can be silently held in place and eliminate annoying vibrations or rattling that can take a toll on a long trip.

Figure 3:
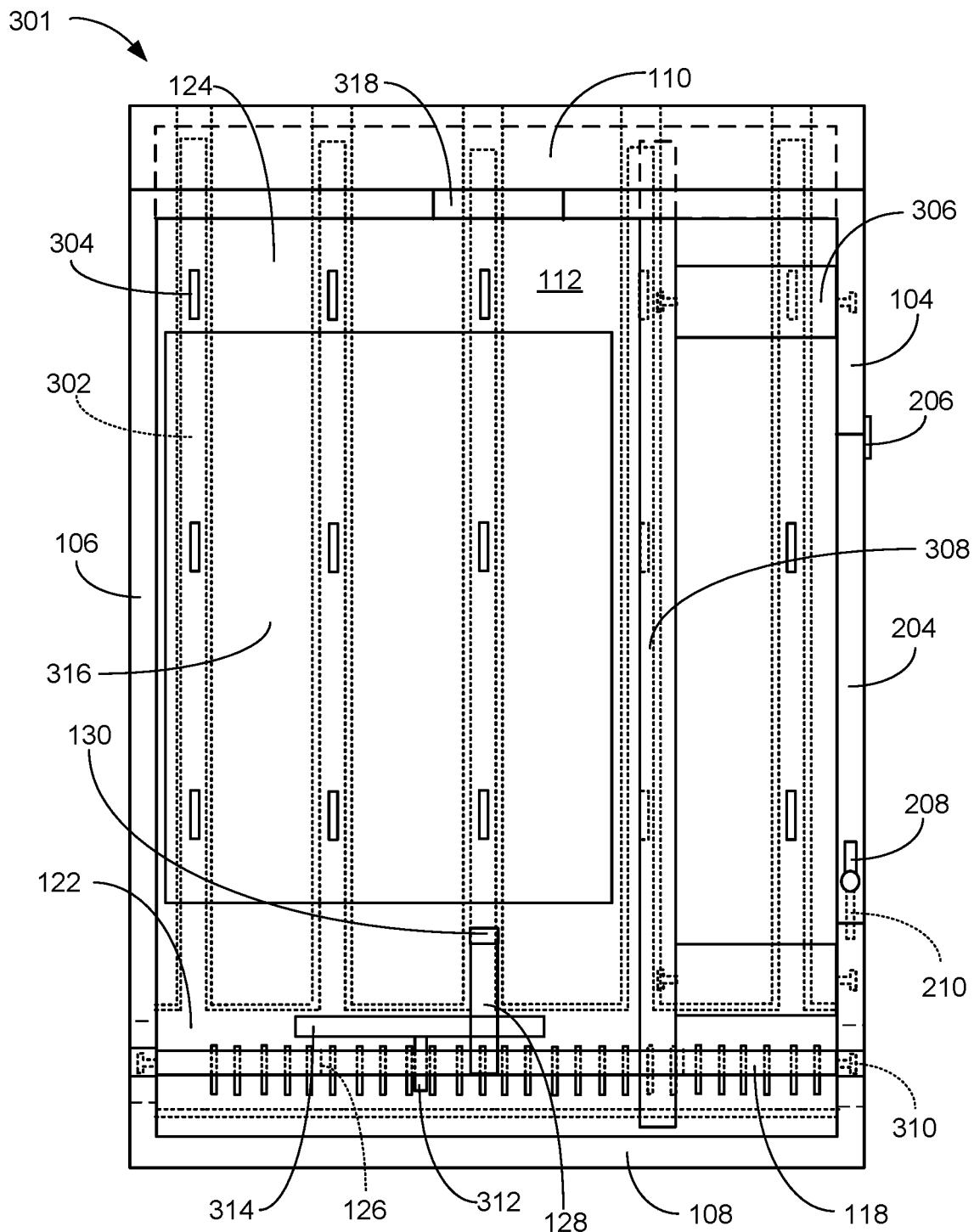
FIG. 3 is an example of a plan view of the in-vehicle carrier system in an embodiment of the present invention.

Referring now to FIG. 3, therein is shown an example of a plan view 301 of the in-vehicle carrier system 100 in an embodiment of the present invention. The plan view 301 of the in-vehicle carrier system 100 depicts the first sidewall 104, the second sidewall 106, the backwall assembly 108, the front wall assembly 110, the crossbar 118, and the base floor assembly 112 configured as a pet carrier. The base floor assembly 112 can include a supporting channel 302 that can extend from the pedestal 122 to the underside of the front wall assembly 110. The supporting channel 302 can be formed by the rotomolding process to form a hollow channel beneath the floor surface 124. A liquid drain 304 can be formed in the floor surface 124, which can allow any liquid spilled on the floor surface 124 to run down into the support channel 302 and back into the pedestal 122 for containment.

By way of an example, an animal being transported in the in-vehicle carrier system 100 can urinate on the floor surface 124. Any liquid that contacts the floor surface 124 can pass through the liquid drain 304 into the supporting channel 302. The liquid can pass through the supporting channel 302 to the pedestal 122 for storage. The liquid is moved away from the animal to keep the floor surface 124 and the animal dry. The in-vehicle carrier system 100 can protect the vehicle back seat 202 of FIG. 2.

A telescoping brace 306 can extend from the first sidewall 104 to a divider panel 308. The divider panel 308 can be formed by the rotomolding process to have rigid sides and a hollow center region. By way of an example, a locking tab 310 can be formed on the telescoping brace 306 in the shape of nail head. The locking tab 310 can extend into a round opening and pull down into a narrower opening, allowing the locking tab 310 to be fastened in place. The telescoping brace 306 can extend to approximately three times its retracted length. By way of an example, a retracted version of the telescoping brace 306 that measures four inches can extend to a 12 inch length. By way of an example, extending the divider panel 308 away from the first sidewall 104, the divider panel 308 can provide side support for an animal (not shown) contained in the in-vehicle carrier system 100. The position of the divider panel 308 can also be used to secure cargo, such as a cooler, a tool box, a fragile package, or a combination thereof.

By way of another example, the crossbar 118 can be attached between the first sidewall 104 and the second sidewall 106 by the locking tab 310. The crossbar 118 can include the slotted opening 126 formed as an opening through the horizontal middle of the crossbar 118. A threaded shaft 312 can extend through the slotted opening 126 as a holder for a padded support 314. The threaded shaft 312 and the padded support 314 can protect an animal (not shown) during acceleration that could cause motion into the crossbar 118. The padded support can be a foam filled pillow over a fixed base panel that is connected to the threaded shaft 312. The tether 128 and the release mechanism 130 can attach to a pet harness (not shown) that can help secure the animal being transported. The release mechanism 130 can be manually or electronically released. By releasing the release mechanism 130, the animal being transported will be free to exit the in-vehicle carrier system 100.

A washable travel pad 316 can be installed in the open area of the floor surface 124. The washable travel pad 316 can be a fabric pillow structure suitable for providing comfort to the animal being transported in the in-vehicle carrier system 100. It is understood that different sizes and thicknesses of the washable travel pad 316 can be envisioned. An electronic control module 318 can be configured to sense a temperature within the in-vehicle carrier system 100, provide a visual record of the activities in the in-vehicle carrier system 100, detect motion in the in-vehicle carrier system 100, monitor for audible signs of agitation, and release pheromones in the interior of the in-vehicle carrier system 100 to calm the animal being transported. If the electronic control module 318 detects audible signs of agitation, such as barking, crying, growling, or the like, a jolting signal can be sent to a collar or harness worn by the animal being transported.

It has been discovered that the in-vehicle carrier system 100 can protect against liquid damage by channeling any liquid through the liquid drain 304 into the supporting channel 302 and ultimately into the pedestal 122 where it can be contained until it is ready to be purged. The width of the available space of the floor surface 124 can be limited by the divider panel 308 and the telescoping brace 306. The divider panel 308 can add support for stabilizing pets or cargo in the available area of the floor surface 124.

Figure 4:
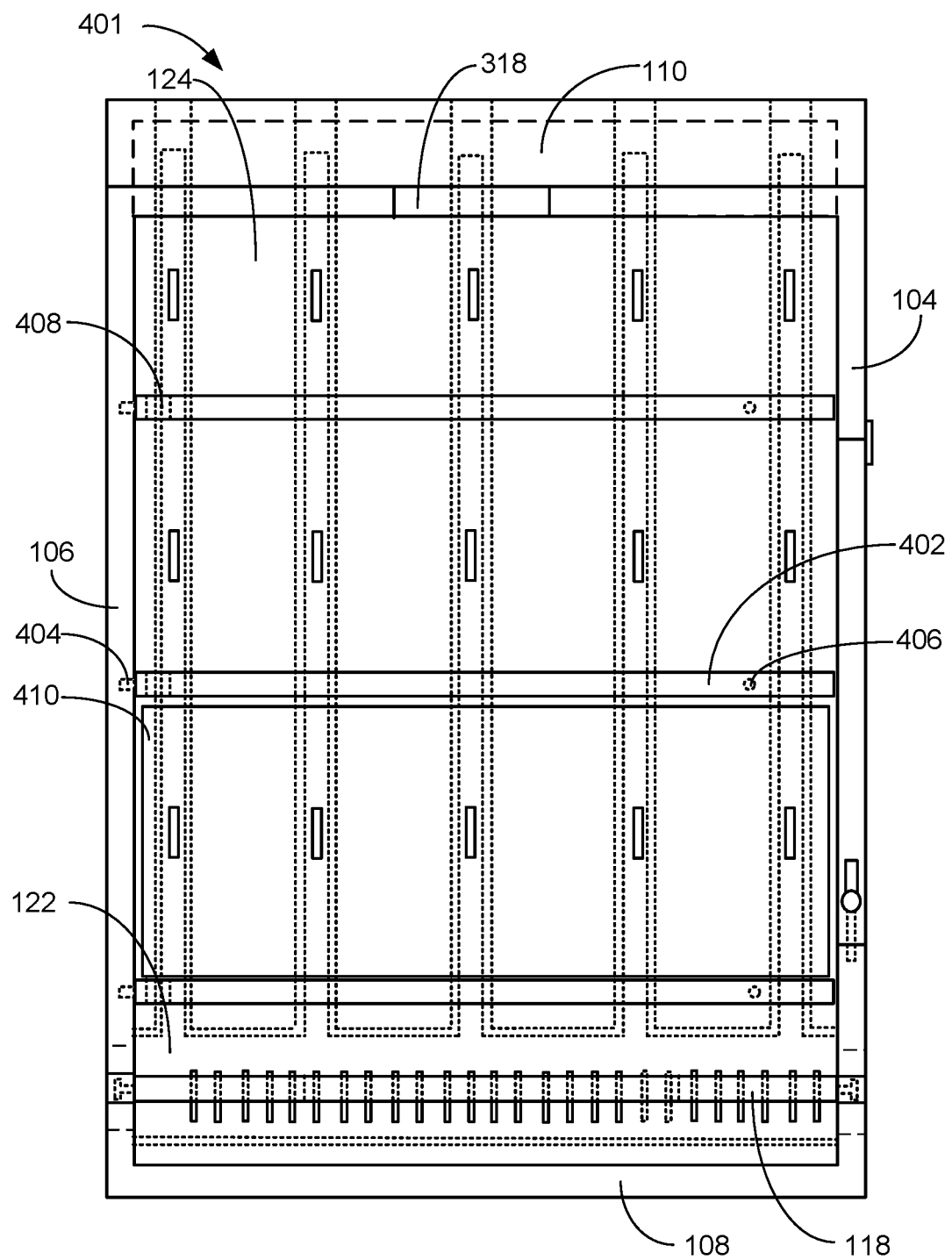
FIG. 4 is an example of a plan view of the in-vehicle carrier system in a further embodiment of the present invention.

Referring now to FIG. 4, therein is shown an example of a plan view 401 of the in-vehicle carrier system 100 in an alternative embodiment of the present invention. The plan view 401 of the in-vehicle carrier system 100 depicts the first sidewall 104, the second sidewall 106, the backwall assembly 108, the front wall assembly 110, the crossbar 118, and the base floor assembly 112 configured as a cargo carrier. The base floor assembly 112 can include a supporting channel 302 that can extend from the pedestal 122 to the underside of the front wall assembly 110. The cantilever design of the supporting channel 302 extending from the pedestal 122 to the outer edge of the front wall assembly 110 can provide a level and stable platform for carrying goods and products.

By way of an example, any cargo being transported in the in-vehicle carrier system 100 can leak liquid on the floor surface 124. The liquid that contacts the floor surface 124 can pass through the liquid drain 304 into the supporting channel 302. The liquid can pass through the supporting channel 302 to the pedestal 122 for storage. The liquid is moved away from any cargo to keep the floor surface 124 and the cargo dry. The in-vehicle carrier system 100 can protect the vehicle back seat 202 of FIG. 2.

A compartment divider 402 can be formed by the roto-molding process to have a rigid outer structure with a hollow core. A position pin 404 can be on a vertical edge and extending in a horizontal direction. It is understood that multiple of the position pin can be required in order to fix the location of the compartment divider 402. A holding pin 406 can be formed on the bottom edge of the compartment divider 402 protruding in a vertical direction. The position pin 404 can protrude into the second sidewall 106 and the holding pin 406 can protrude into the floor surface 124 in order to stabilize the compartment divider 402 and prevent its movement when pressured by cargo. The compartment divider 402 can include a utility opening 408 in a position adjacent to the position pin 404. The purpose of the utility opening 408 will be discussed in the description of FIG. 6.

A thermal platform 410 can be placed between instances of the compartment divider 402 in order to act as a hot plate for delivery of prepared food (not shown) that is transported in the in-vehicle carrier system 100. The thermal platform 410 can be a heating element with a battery power source integrated therein. The electronic control module 318 can be configured to sense a temperature within the in-vehicle carrier system 100, adjust the temperature of the thermal platform 410, determine the status of the battery power within the thermal platform 410, provide a visual record of the activities in the in-vehicle carrier system 100, and send an alert message if a condition requires intervention.

It is understood that multiple of the thermal platform 410 can be carried in the in-vehicle carrier system 100. The electronic control module 318 can communicate with each of the thermal platform 410 to determine its temperature and status. The electronic control module 318 can issue audible alarms, send cellular text alerts to a pre-defined cell phone or both.

It has been discovered that the in-vehicle carrier system 100 can transport prepared food, groceries, tools, parcels, or the like in a cargo transport mode. By positioning the compartment divider 402, the available area of the floor surface 124 can be segmented for individual purposes. While one section can transport prepared food that remains heated, another section can transport unheated groceries. The flexibility of the in-vehicle carrier system 100 can satisfy multiple transport needs with minimal reconfiguration. By way of an example, the compartment divider 402 can be removed from the floor surface 124 and stored between the crossbar 118 and the back wall assembly 108 without the use of tools.

Figure 5:
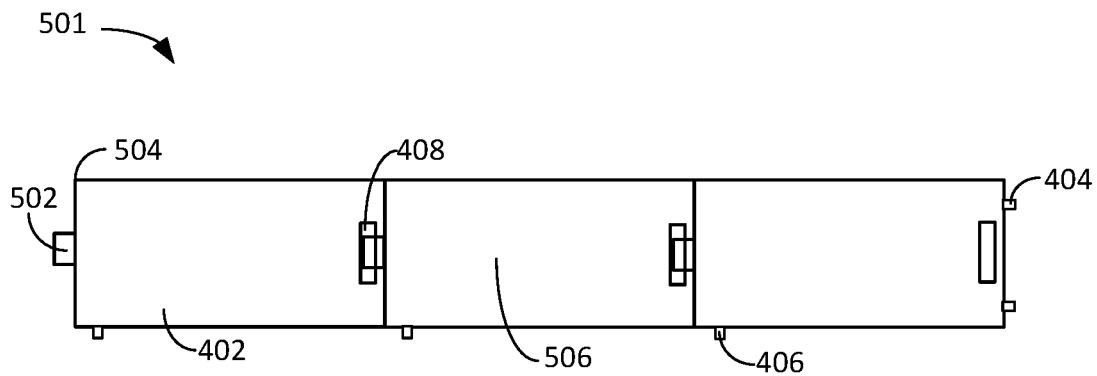
FIG. 5 is an assembly drawing of a ramp assembly for the in-vehicle carrier system in an embodiment of the present invention.

Referring now to FIG. 5, therein is shown an assembly drawing of a ramp assembly 501 for the in-vehicle carrier system 100 in an embodiment of the present invention. The assembly drawing of a ramp assembly 501 can depict multiple instances of the compartment divider 402 joined to form the ramp assembly 501. Each of the compartment divider 402 can include a locking tab 502 protruding from a first edge 504 and the utility opening 408 proximate an edge opposite the first edge 504.

In assembling the ramp assembly 501, the locking tab 502 of one of the compartment divider 402 can extend into the utility opening 408 of another of the compartment divider 402 and snapped together. A walking surface 506 of the compartment divider 402 can be textured to provide a non-skid surface or it can be coated with a non-skid material.

It has been discovered that the compartment divider 402 can serve as a part of the ramp assembly 501 and is assembled without tools. The combination of the locking tab 502 and the utility opening 408 can provide an assembly mechanism that can support the weight of a large dog, while snapping apart for storage within the in-vehicle carrier system 100.

Figure 6:
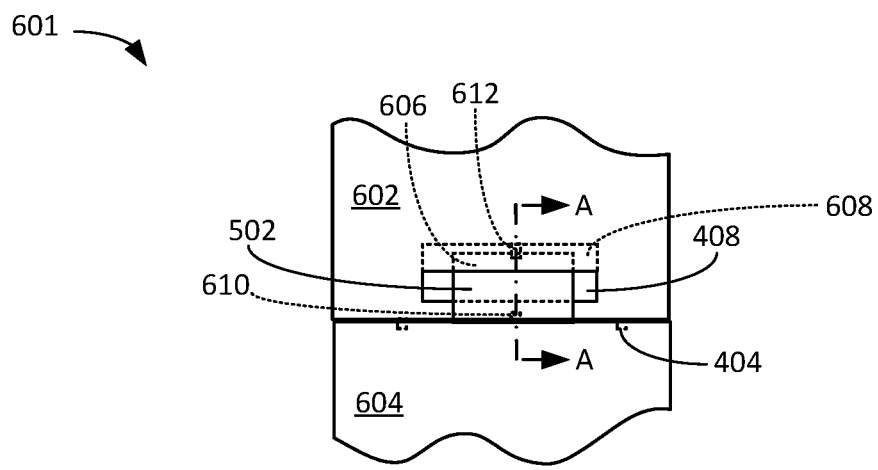
FIG. 6 is a more detailed plan view of the latching mechanism of the ramp assembly in an embodiment of the present invention.

Referring now to FIG. 6, therein is shown an expanded plan view of the latching mechanism 601 of the ramp assembly 501 in an embodiment of the present invention. The expanded plan view of the latching mechanism 601 of the ramp assembly 501 depicts a first compartment divider 602 interconnected to a second compartment divider 604. The locking tab 502 of the second compartment divider 604 can be inserted through the utility opening 408 of the first compartment divider 602. By way of an example, two of the position pin 404 of the first compartment divider 602 can align with receiving holes (not shown) in the second compartment divider 604.

The locking tab 502 can include a step-down tab 606 of the second compartment divider 604. The step-down tab 606 fit into a second compartment divider 604 of the first compartment divider 602. The locking cavity 608 can be a recessed area adjacent to the utility opening 408. An engaging pin 610 can be positioned under the locking tab 502 and is configured to engage the first compartment divider 602, when the first compartment divider 602 and the second compartment divider 604 are pushed together in a locking motion. The first compartment divider 602 can include a support pin 612 protruding from the edge of the locking cavity 608 to engage the front of the step-down tab 606 of the second compartment divider 604. When the first compartment divider 602 and the second compartment divider 604 are pushed together in a locking motion they are held in position by a plurality of the position pin 404, the engaging pin 610, and the support pin 612. It is understood that additional instances of the position pin 404, the engaging pin 610, and the support pin 612 can be utilized as required.

A section line A-A is shown as cutting through the center of the latching mechanism 601. This provides a more detailed view of the engagement between the first compartment divider 602 and the second compartment divider 604 in a locked configuration.

Figure 7:
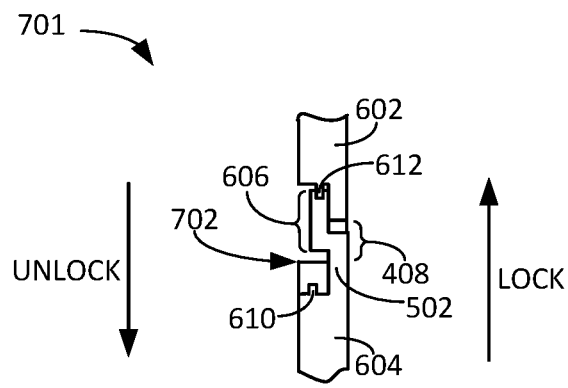
FIG. 7 is a cross-sectional view of the latching mechanism as viewed from the section line A-A of FIG. 6.

Referring now to FIG. 7, therein is shown is a cross-sectional view 701 of the latching mechanism 601 as viewed from the section line A-A of FIG. 6. The cross-sectional view 701 of the latching mechanism 601 depicts the first compartment divider 602 and the second compartment divider 604 locked together as a portion of the ramp assembly 501 of FIG. 5. The step-down tab 606 portion of the locking tab 502 can extend through the utility opening 408 of the first compartment divider 602. Sliding the second compartment divider 604 toward the first compartment divider 602 can engage the engaging pin 610 and the support pin 612 in their respective locations.

The first compartment divider 602 and the second compartment divider 604 can be disengaged by pulling the first compartment divider 602 and the second compartment divider 604 away from each other until the step-down tab 606 contacts an unlock surface 702 of the utility opening 408. The engaging pin 610 and the support pin 612 are completely disengaged when the step-down tab 606 contacts the unlock surface 702. Once the engaging pin 610 and the support pin 612 are disengaged, the step-down tab 606 can be removed from the utility opening 408 to allow the first compartment divider 602 and the second compartment divider 604 to be stored between the crossbar 118 of FIG. 1 and the back wall assembly 108 of FIG. 1.

Figure 8:
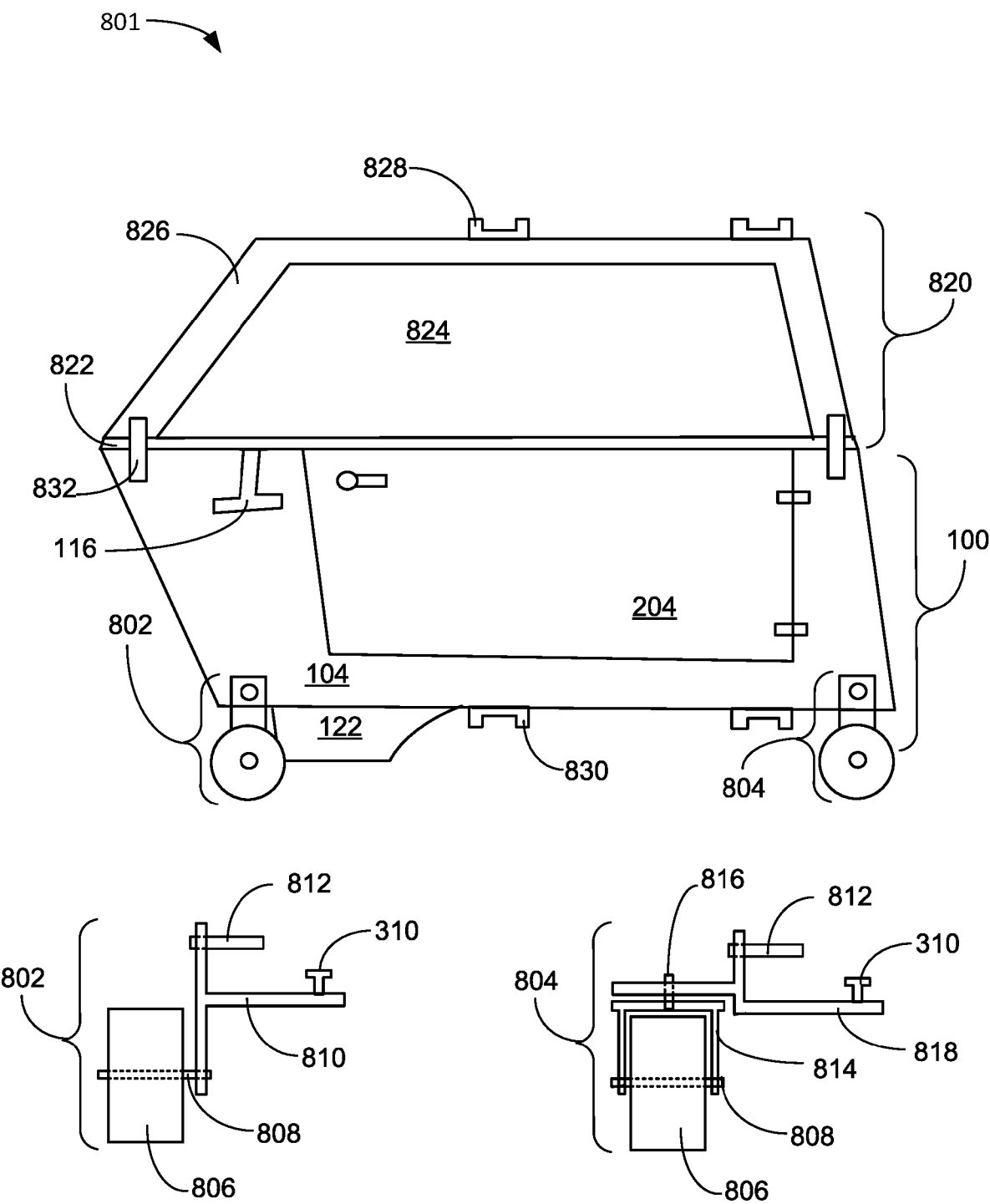
FIG. 8 is a side view of a travel system of the in-vehicle carrier system in an embodiment.

Referring now to FIG. 8, therein is shown a side view of a travel system 801 of the in-vehicle carrier system 100 in an embodiment. The side view of a travel system 801 of the in-vehicle carrier system 100 depicts the in-vehicle carrier system 100 having accessories added to form the travel system 801.

A rear wheel assembly 802 can be mounted in the first sidewall 104 and the second sidewall 106 of FIG. 1 adjacent to the pedestal 122. By way of an example, an enlargement of the rear wheel assembly 802 shows a wheel 806 mounted on an axel 808 that is cantilevered from a rear wheel frame 810 including the locking tab 310. The wheel 806 can be formed of rubber, plastic, metal, or a combination thereof. The axel 808, the rear wheel frame 810, and the locking tab 310 can be formed from a metal or an injected plastic, including a carbon fiber filled ABS, a nylon filled polyurethane, a polycarbonate plastic, or the like. The rear wheel frame 810 can extend under the base floor assembly 112 of FIG. 1 to engage the locking tab 310 in the base floor assembly 112. An attaching pin 812 can prevent the rear wheel assembly 802 from becoming detached from the first sidewall 104 and the second sidewall 106. The attaching pin 812 can be a quick disconnect type of fastener, including a quarter turn fastener, a push to insert and release to lock fastener, a pin and clip fastener, or the like.

The front wheel assembly 804 can be a dolly wheel configuration that allows 360 degree rotation for steering the travel system 801. The front wheel assembly 804 can be mounted in the first sidewall 104 and the second sidewall 106 adjacent to the front wall assembly 110 of FIG. 1. By way of an example, an enlargement of the front wheel assembly 804 shows the wheel 806 mounted on the axel 808 that is inserted in a dolly frame 814. The dolly frame 814 is a "U" shaped frame that has a pivot pin 816 centered over the wheel 806. The pivot pin 816 can be mounted in a front wheel frame 818 including the locking tab 310.

The wheel 806 can be formed of rubber, plastic, metal, or a combination thereof. The axel 808, the front wheel frame 818, and the locking tab 310 can be formed from a metal or an injected plastic, including a carbon fiber filled ABS, a nylon filled polyurethane, a polycarbonate plastic, or the like. The front wheel frame 818 can extend under the base floor assembly 112 to engage the locking tab 310 in the base floor assembly 112. The attaching pin 812 can prevent the front wheel assembly 804 from becoming detached from the first sidewall 104 and the second sidewall 106. The attaching pin 812 can be a quick disconnect type of fastener, including a quarter turn fastener, a push to insert and release to lock fastener, a pin and clip fastener, or the like.

It is understood that other types of structures can be used for the rear wheel assembly 802 and the front wheel assembly 804. The structures described are as an example only and are not provided in a limiting fashion.

A protective canopy 820 can mount on an interface structure 822. The protective canopy 820 can be formed of a metal cage type of cover, a Plexiglas cover, a plastic molded cover, or a combination thereof. The protective canopy 820 protect the interior space of the in-vehicle carrier system 100 from weather elements, such as sun, rain, hail, gusty winds, and the like. By way of an example, in a law enforcement application, the protective canopy 820 can include a side panel 824, such as a wire screen panel, and a top section 826, such as a plastic top. It is understood that the materials of the side panel 824 and the top section 826 can be the same material, or different material without modification of the present invention. The interface structure 822 can be formed of a rubber or plastic material used to integrate the different materials of the side panel 824 and the top section 826.

A top strap holder 828 can be formed in the top section 826 for the purpose of positioning the restraining strap 220 of FIG. 2 for securing the protective canopy 820 to the in-vehicle carrier system 100 during shipment or transport. A bottom strap holder 830 can be attached to the base floor assembly 112 of FIG. 1 to allow the restraining strap 220 to enclose the travel system 801 during transport. Additionally securing latches 832 can hold the protective canopy 820 to the in-vehicle carrier system 100. The securing latches 832 can be of a cargo type latch.

The travel system 801 can be suitable for airline transport by positioning the travel system 801 in an airline seat (not shown) and securing it by the lap belt attached through the tie-down slot 116. It is understood that a lap belt extension could be positioned in the travel system 801 prior to loading. This would simplify the securing of the travel system 801 during the loading process.

It has been discovered that the travel system 801 can provide a secure enclosure for transport of animals or cargo. The configuration of the protective canopy 820 is suitable for transport of Military or Law Enforcement K9's as well as a family pet. The combination of the side panel 824 and the top section 826 of the protective canopy 820 can provide sun shades and general weather screening for the protection of the interior space of the travel system 801. It is understood that different versions of the protective canopy 820 can be affixed to the in-vehicle carrier system 100 for different applications.

Figure 9:
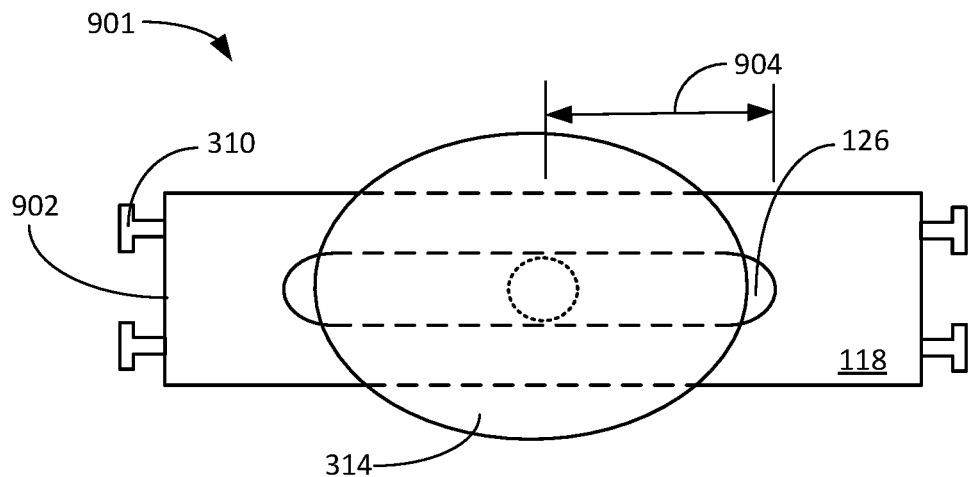
FIG. 9 is a plan view of a crossbar system in an embodiment of the present invention.

Referring now to FIG. 9, therein is shown a plan view of a crossbar system 901 in an embodiment of the present invention. The plan view of a crossbar system 901 depicts the crossbar 118 having the locking tabs 310 positioned on the vertical sides 902. The slotted opening 126 can act as a holder for a padded support 314. The position and length of the slotted opening 126 is an example only and can be different for other applications. By way of an example, the divider panel 308 can be installed and the padded support 314 may be restricted to the right side 904. It is understood that the use of the locking tabs 310 is an example only and other attaching mechanisms are possible.

Figure 10:
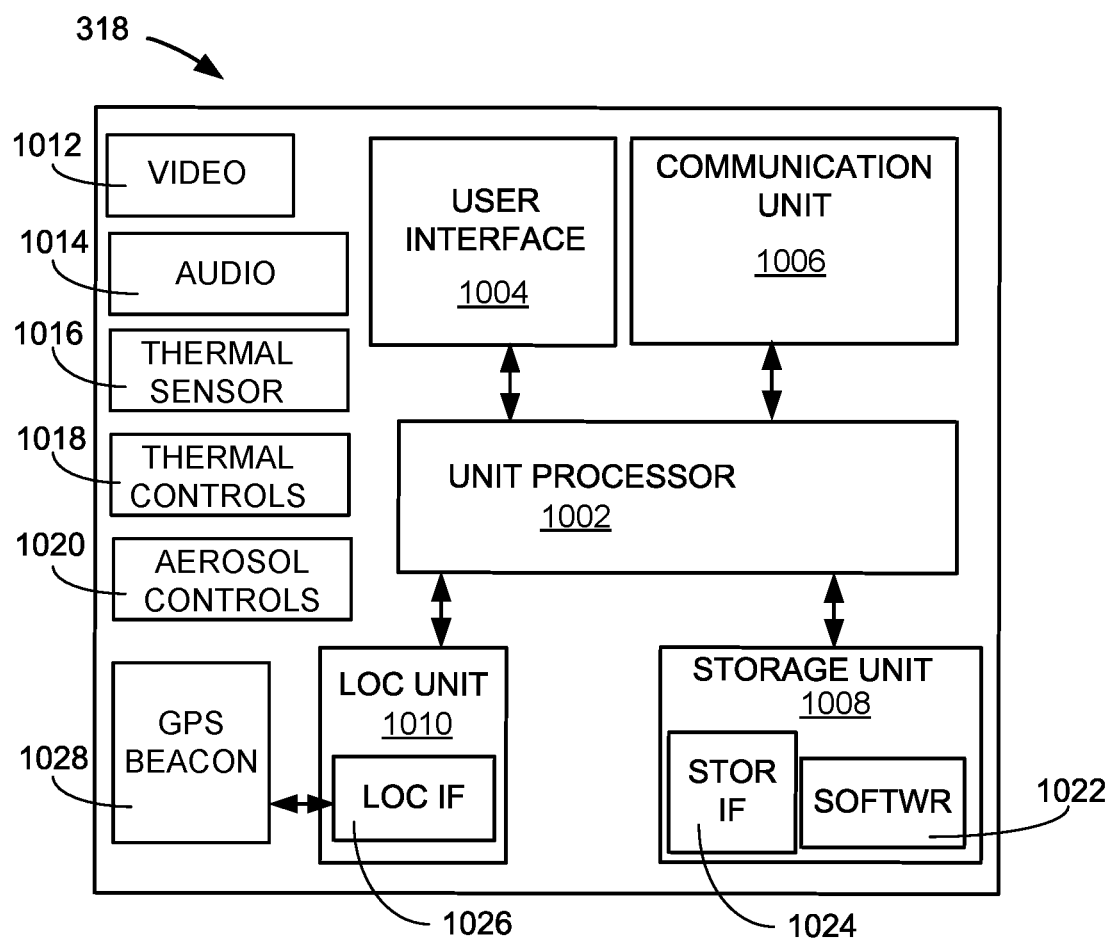
FIG. 10 is a functional block diagram of the electronic control module for operating the in-vehicle carrier system in an embodiment.

Referring now to FIG. 10, therein is shown a functional block diagram of the electronic control module 318 for operating the in-vehicle carrier system 100 in an embodiment. The functional block diagram of the electronic control module 318 depicts a unit processor 1002 coupled to a user interface 1004, a communication unit 1006, a storage unit 1008, and a location unit 1010.

The electronic control module 318 can be implemented in a number of different manners. For example, the unit processor 1002 can be a processor, an application specific integrated circuit (ASIC), an embedded processor, a microprocessor, a hardware control logic, a hardware finite state machine (FSM), a digital signal processor (DSP), or a combination thereof. The unit processor 1002 can provide the command and control of the electronic control module 318.

The electronic control module 318 can be coupled to the user interface 1004 in order to establish the working environment of the in-vehicle carrier system 100. The user interface 1004 can provide input and output services that define the operation of the in-vehicle carrier system 100 as a cargo carrier or an animal carrier. The user interface 1004 can interface with a number of peripheral devices including a video sensor 1012, and audio sensor 1014, a thermal sensor 1016, a thermal control 1018, an aerosol control 1020, or a combination thereof. It is understood that other peripheral devices can be defined to interface with the user interface 1004.

The video sensor 1012 can be a camera or other video recording device. The video sensor 1012 can monitor any activities that take place in the interior space of the in-vehicle carrier system 100. The audio sensor 1014 can include a microphone, an acoustic recognition unit, a noise identifier, or the like. The audio sensor 1014 can be configured to capture all sounds that come from the interior of the in-vehicle carrier system 100 or it can identify specific sounds or groups of sounds. The thermal sensor 1016 can include a series of thermocouples placed throughout the in-vehicle carrier system 100. The thermal sensor 1016 can monitor the temperature in specific areas of the in-vehicle carrier system 100. The thermal sensor 1016 can have thresholds that cause them to activate and each of the thermocouples can be activated separately. The pattern of heat sensed by the thermal sensor 1016 can determine whether it is safe for cargo or animals as established through the user interface 1004.

The thermal controls 1018 allow the electronic control module 318 to manage the thermal platform 410 of FIG. 4. The thermal controls 1018 can be coupled to the thermal platform 410 either through a wired or wireless connection. The thermal controls 1018 can activate and control the heating function in the thermal platform 410 as defined in the user interface 1004. The aerosol controls 1020 can control a series of spray jets (not shown) positioned in the in-vehicle carrier system 100. When the in-vehicle carrier system 100 is configured as an animal carrier, the aerosol controls 1020 can release pheromones that can calm the animal. The electronic control module 318 can detect an audio response, through the audio sensor 1014, from the animal and classify it as a bark, howl, whine, or a combination thereof. In response to the input from the animal, the aerosol controls 1020 can release a predefined amount of pheromone to calm or comfort the animal.

The communication unit 1006 can be configured to send messages about the status of the in-vehicle carrier system 100, the current video sensor 1012 input, and the audio sensor 1014 input. The communication unit 1006 can be an electronic device for cellphone communication or Internet interaction. The communication unit 1006 can receive selected messages and configurations from the unit processor 1002. The communication unit 1006 can also be configured to send an electronic signal to activate the release mechanism 130 of FIG. 1 attached to the tether 128 of FIG. 1 for the purpose of releasing a harness (not shown) from the tether 128.

The storage unit 1008 can store the software 1022 used by the unit processor 1002 to provide the command and control of the electronic control module 318. The storage unit 1008 can include a nonvolatile storage such as non-volatile random access memory (NVRAM), Flash memory, disk storage, or a volatile storage such as static random access memory (SRAM). The storage unit 1008 can receive input from the video sensor 1012, the audio sensor 1014 and the thermal sensor 1016 as determined by the unit processor 1002. The input information can be received by a storage interface 1024 and maintained in the storage unit 1008 for later reference.

The location unit 1010 can generate location information, current heading, current acceleration, and current speed of the in-vehicle carrier system 100, as examples. By way of an example, the location unit 1010 can function as at least a part of the global positioning system, an inertial computer system, a cellular-tower location system, a pressure location system, or any combination thereof for generating location information. The location unit 1010 can include a location interface 1026. The location interface 1026 can be a circuit that allows the location unit 1010 to interact with devices other that the unit processor 1002. The location interface 1026 can be connected to a GPS beacon 1028 that is capable of transmitting a location signal in a pre-configured message for locating the in-vehicle carrier system 100.

The GPS beacon 1028 can be activated by the unit processor 1002 when the travel system 801 of FIG. 8 is being used. The conditions for activating the GPS beacon 1028 can be determined by the unit processor. By way of an example, the communication unit 1006 can receive an activation signal from an external cellphone. The communication unit 1006 can interrupt the unit processor for priority service and transfer the GPS beacon request to the unit processor 1002. The unit processor 1002 can configure an identification message including the current location and activate the GPS beacon to repeatedly transfer the identification message for a pre-configured amount of time.

It has been discovered that the electronic control module 318 can provide support for video, audio, and thermal status from the in-vehicle carrier system 100 in many of its configurations. The unit processor 1002 can be configured to respond to the needs of animals or cargo being transported in the in-vehicle carrier system 100. The user interface 1004 can allow a user to establish desired responses to any situation that is a concern. The electronic control module 318 can take steps to mitigate the situations that were defined by the user and send alert or status messages for any situation that is not defined. The communication unit 1006 can transfer cellular text messages to a pre-configured number or numbers. When the travel system 801 is not where it is expected to be, a call to the communication unit 1006 can cause the unit processor 1002 to activate the GPS beacon 1028 in order to locate the travel system 801.

Figure 11:
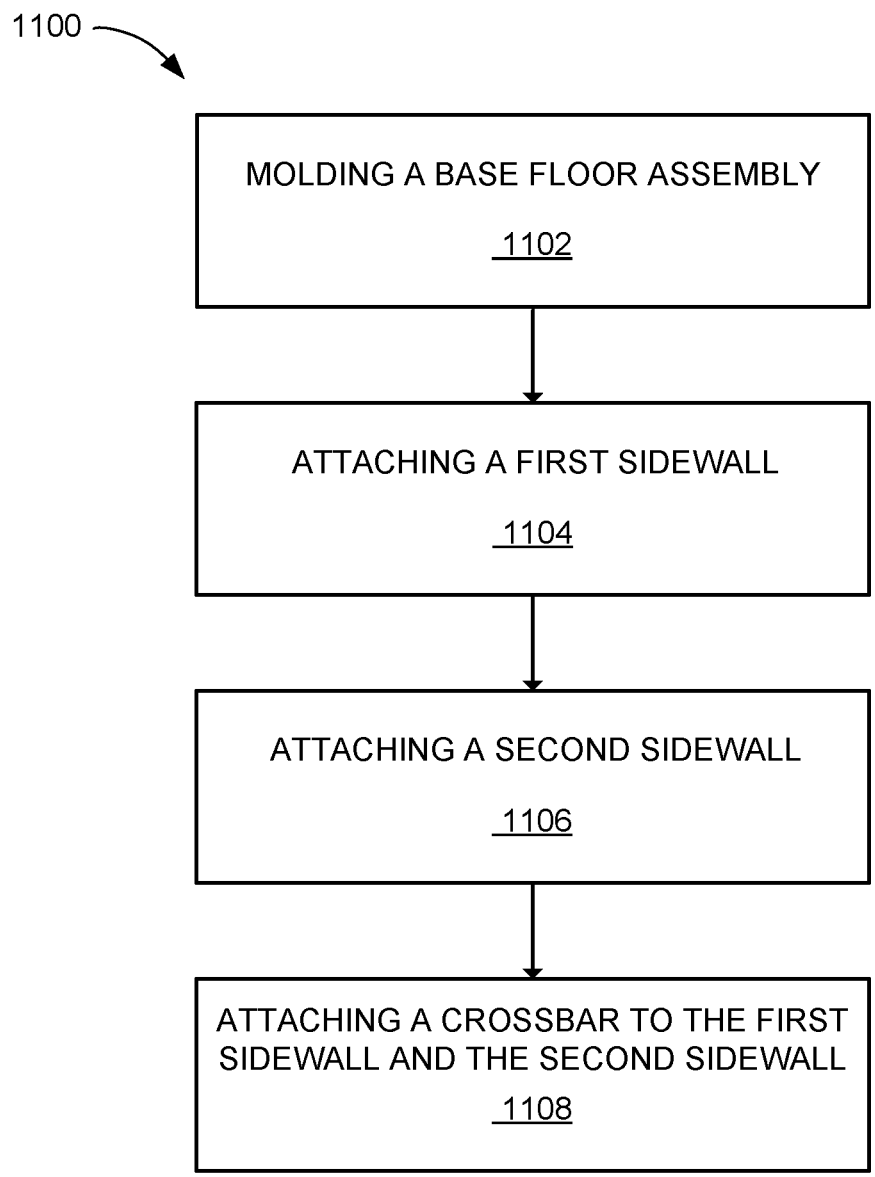
FIG. 11 is a flow chart of a method of manufacture of an in-vehicle carrier system in an embodiment of the present invention.

Referring now to FIG. 11, therein is shown a flow chart of a method 1100 of manufacture of an in-vehicle carrier system 100 in an embodiment of the present invention. The method 1100 includes: molding a base floor assembly including: forming a floor surface including a liquid drain, positioning a supporting channel below the floor surface and open to the liquid drain, attaching a pedestal below the floor surface and coupled to the supporting channel in a block 1102; attaching a first sidewall, formed by a molding process, to the base floor assembly on the floor surface in a block 1104; attaching a second sidewall, formed by molding, to the base floor assembly on the floor surface in a block 1106; and attaching a crossbar, formed by molding, above the pedestal and connected to the first sidewall and the second sidewall in a block 1108.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of manufacturing an in-vehicle carrier system comprising:
   molding a base floor assembly including:
      forming a floor surface including a liquid drain,
      positioning a supporting channel below the floor surface and open to the liquid drain,
      attaching a pedestal below the floor surface and coupled to the supporting channel;
   attaching a first sidewall, formed by a molding process, to the base floor assembly on the floor surface;
   attaching a second sidewall, formed by molding, to the base floor assembly on the floor surface; and
   attaching a crossbar, formed by molding, above the pedestal and connected to the first sidewall and the second sidewall.

2. The method as claimed in claim 1, further comprising attaching a backwall assembly to the base floor assembly, the first sidewall, and the second sidewall proximate the crossbar.

3. The method as claimed in claim 1, further comprising attaching a front wall assembly, formed by molding, to the base floor assembly, the first sidewall, and the second sidewall opposite a back wall assembly.

4. The method as claimed in claim 1, wherein attaching the first sidewall includes a door opening configured to accept an access door and a tie-down slot configured to accept a restraining strap for maintaining the position of the in-vehicle carrier system.

5. The method as claimed in claim 1, further comprising flexibly attaching an access door to the first sidewall by a non-rattle hinge and a slide latch positioned on an edge of the access door opposite the non-rattle hinge.

6. The method as claimed in claim 1, further comprising attaching a protective dome above the base floor assembly and attached to the first sidewall and the second sidewall by a cargo latch.

7. The method as claimed in claim 1, further comprising attaching an access door, including a bullet proof core, to the first sidewall by a non-rattle hinge and a slide latch positioned on an edge of the access door opposite the non-rattle hinge.

8. The method as claimed in claim 1, further comprising attaching a front wall assembly, formed by molding, to the base floor assembly, the first sidewall, and the second sidewall opposite a back wall assembly including mounting an electronic control module in a controller housing at a top central location of the front wall assembly and opposite the floor surface.

9. The method as claimed in claim 1, wherein attaching the crossbar connected to the first sidewall and the second sidewall includes a tether coupled to a release mechanism attached at a top center of the crossbar.

10. The method as claimed in claim 1, further comprising attaching a rear wheel assembly and a front wheel assembly to the first sidewall, the second sidewall, and the base floor assembly.

* * * * *